No. 651,335. Patented June 12, 1900.
J. & J. C. BELL.
DRAFT EQUALIZER.
(Application filed Nov. 24, 1899.)
(No Model.)
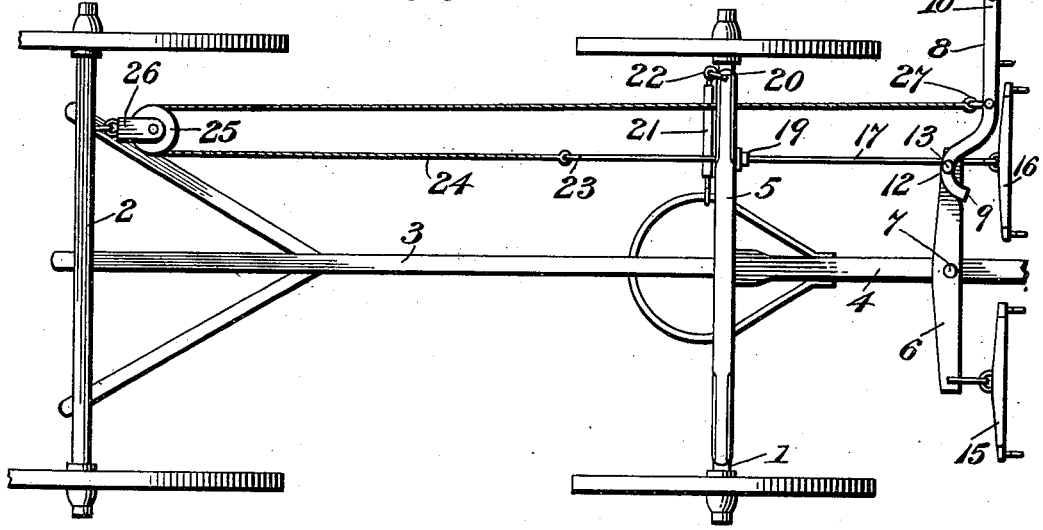
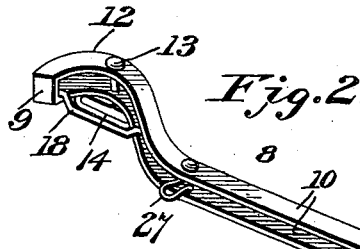
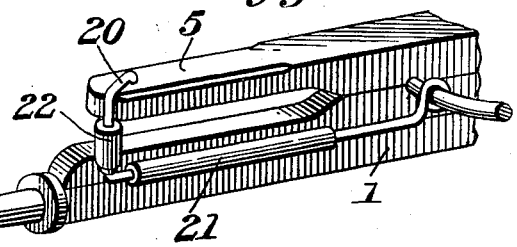
Witnesses
Edwin G. McKee.
R. M. Smith.
John C. Bell and
John Bell  Inventors
By C. G. Siggers  Attorney
THE NORRIS PETERS CO., PHOTO-LITHO., WASHINGTON, D. C.

UNITED STATES PATENT OFFICE.

JOHN BELL AND JOHN CLYDE BELL, OF HARVEYVILLE, KANSAS.

DRAFT-EQUALIZER.

SPECIFICATION forming part of Letters Patent No. 651,335, dated June 12, 1900.

Application filed November 24, 1899. Serial No. 738,200. (No model.)

*To all whom it may concern:*

Be it known that we, JOHN BELL and JOHN CLYDE BELL, citizens of the United States, residing at Harveyville, in the county of Wabaunsee and State of Kansas, have invented a new and useful Draft-Equalizer, of which the following is a specification.

This invention relates to draft-equalizers, and has for its object to provide a construction and arrangement of single and double trees whereby three draft-animals may be hitched to a wagon or other vehicle or implement so that the draft will be equally distributed upon each animal without causing any side draft on the tongue or vehicle.

The detailed objects and advantages of the invention will appear more fully in the course of the ensuing description.

The invention consists in a draft-equalizer embodying certain novel features and details of construction and arrangement of parts, as hereinafter fully described, illustrated in the drawings, and incorporated in the claims.

In the accompanying drawings, Figure 1 is a plan view showing a sufficient portion of the running-gear of a vehicle to illustrate the application of the present invention thereto. Fig. 2 is a detail perspective view of the evener. Fig. 3 is a plan view of the rod to which the intermediate singletree is attached. Fig. 4 is a detail perspective view of one end of the front axle and superimposed bolster or sand-board, showing the relation of the draft-rod and rope or cable thereto.

Similar numerals of reference designate corresponding parts in all the figures of the drawings.

In the drawings we have illustrated a portion of the running-gear of a wagon, in which 1 designates the front axle; 2, the rear axle; 3, the reach-bar; 4, the tongue; 5, the front bolster or sand-board, and 6 the doubletree, which is centrally pivoted at 7 to the tongue in the usual manner.

In carrying out the present invention we employ an evener 8, which is preferably formed in one piece from bar iron or steel, bent about centrally to form a connecting portion or end stop 9 and parallel outwardly-extending members or portions 10. Between the outer extremities of these is pivotally mounted a singletree 11, to which one of the draft-animals is adapted to be hitched. The evener adjacent to its inner end is curved in semicircular form, as shown at 12, so as to embrace one end of the doubletree 6, and is pivotally connected to the doubletree by means of a vertical eyebolt 13, having at its lower end an eye 14, the purpose of which will hereinafter appear. The connecting portion or stop 9 acts against the front edge of the doubletree and limits the swinging movement of the outer or projecting end of the evener in a forward direction. Attached to the opposite end of the doubletree 6 is another singletree 15, to which another draft-animal may be hitched.

The third or intermediate singletree (indicated at 16) is connected pivotally to the forward end of a draft-rod 17, which passes through the eye 14 of the eyebolt 13 and also over a rest 18, extending diametrically across the semicircular portion of the evener in a plane below the doubletree, whereby the draft-rod 17 is confined and allowed to move backward and forward between said rest 18 and the doubletree, the draft-rod 17 being provided with a stop 19, which is located between the doubletree and the front axle and which acts to limit the backward and forward movement of the draft-rod. Attached to the bolster or sand-board 5 is a bracket 20, upon which is mounted a roller 21, disposed horizontally, over and upon which the draft-rod 17 slides. The bracket also comprises a vertical portion around which is disposed a vertical roller 22, which prevents the draft-rod and rope or cable, hereinafter referred to, from moving laterally far enough to come in contact with the wheel at that end of the front axle.

The draft-rod 17 is provided at its rear end with an eye 23, to which is attached one end of a rope or cable 24, which extends rearwardly and passes around a grooved pulley 25, journaled in a bracket 26, connected to the rear axle 2. After passing around the pulley 25 the cable 24 extends forward, passing over the roller 21 and attaching at its forward end at the point 27 to the evener 8 at a point intermediate the ends of said evener. The point of attachment of the cable 24 to the evener 8 at 27 from the singletree 11 should be equal to the distance between the pivotal point of the doubletree and the point of attachment of the singletree 15. The distance between the pivotal point 7 and the point of attachment 27 on the evener should be equal to or greater than the distance between the pivotal point 7 and the singletree 15 or equal to or greater than the distance between the point 27 and the singletree 11. The distances above set forth should be adhered to in order to produce the best results and effectually equalize the draft on all the animals and equally distribute the load. The evener 8 is so bent that its outer or projecting portion lies in advance of the longitudinal plane of the doubletree, so as to throw the singletree 11 ahead of the doubletree. By reason of the evener embracing the end of the doubletree in the manner shown and described the two parts are braced relatively to each other and the evener is prevented from tilting downward or sagging, while at the same time it is free to turn or swing on its pivotal connection with the doubletree. The eye 14 of the bolt 13 is elongated longitudinally of the doubletree, so as to permit of the necessary amount of lateral movement of the draft-rod 17.

While the pulley 25 is illustrated and described as being mounted on the rear axle, it will be understood that said pulley may be applied to the reach-bar or other part of the running-gear. As the pulling strain is applied to the intermediate singletree 16 in a forward direction, the evener 8 will be drawn in an opposite direction through the interposition of the draft-rod 17 and cable or rope 24, and as a forward pull is given to the singletree 11 a rearward draft will be applied to the intermediate singletree 16, and when the stop 9 comes in contact with the doubletree the opposite end of the doubletree will also be moved in a rearward direction. It will thus be seen that the draft will be equally distributed upon the three animals, each bearing its proper share of the burden.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what is claimed as new, and desired to be secured by Letters Patent, is—

1. In a draft-equalizer, the combination with a doubletree pivotally mounted on the tongue, of an evener pivotally mounted on one end of the doubletree, singletrees on the opposite ends of the doubletree and evener, an intermediate singletree, and a flexible connection between said intermediate singletree and the evener, whereby a reverse movement is imparted to the evener when a forward pull is given to the intermediate singletree, substantially as described.

2. In a draft-equalizer, the combination with a centrally-pivoted doubletree having a singletree at one end, of an evener pivotally mounted on the opposite end of the doubletree, a singletree connected with the outer end of said evener, an intermediate singletree, a draft-rod connected thereto, and a rope or cable connected to said draft-rod and passing around a pulley connected to the running-gear, and also connected to the evener at a point intermediate the ends of the latter, substantially as and for the purpose specified.

3. In a draft-equalizer, the combination with a centrally-pivoted doubletree having a singletree at one end, of an evener pivotally mounted on the opposite end of the doubletree and having a stop which coöperates with the doubletree to limit the forward swinging movement of the evener, a singletree at the outer end of said evener, and an intermediate singletree connected with the evener in such manner as to exert the pull thereon in a direction opposite to that in which the intermediate singletree is moved, substantially as and for the purpose set forth.

4. In a draft-equalizer, a doubletree having a singletree at one end, an evener pivotally mounted on the opposite end of the doubletree and carrying a singletree at its outer end, an intermediate singletree, connections between said singletree and the evener for imparting a reverse movement to the evener, and a rest on the evener across which the draft-rod moves and upon which it is supported, substantially as described.

5. In a draft-equalizer, the combination with a doubletree having a singletree at one end, of an evener pivotally mounted on the opposite end of the doubletree and carrying a singletree at its outer end, an intermediate singletree, operative connections between said intermediate singletree and the evener for imparting a reverse movement to the evener, and a roller adjacent to the front axle over which said connections pass, substantially as set forth.

6. In a draft-equalizer, the combination with a doubletree having a singletree at one end, of an evener pivotally mounted on the opposite end of the doubletree and carrying a singletree, an intermediate singletree, operative connections between said intermediate singletree and the evener for imparting a reverse movement to the evener, and a vertically-disposed roller for preventing said connections from coming in contact with the adjacent wheel of the machine, substantially as described.

7. In a draft-equalizer, the combination with a doubletree having a singletree at one end, of an evener pivotally mounted on the opposite end of the doubletree and carrying a singletree at its opposite end, an intermediate singletree, a draft-rod connected to said intermediate singletree and provided with a stop between the doubletree and front axle of the machine, and a flexible connection between said draft-rod and the evener for imparting a reverse movement to the evener, substantially as and for the purpose set forth.

In testimony that we claim the foregoing as our own we have hereto affixed our signatures in the presence of two witnesses.

JOHN BELL.
JOHN CLYDE BELL.

Witnesses:
 GEO. G. WAUGH,
 C. E. EDLIN.